UNITED STATES PATENT OFFICE.

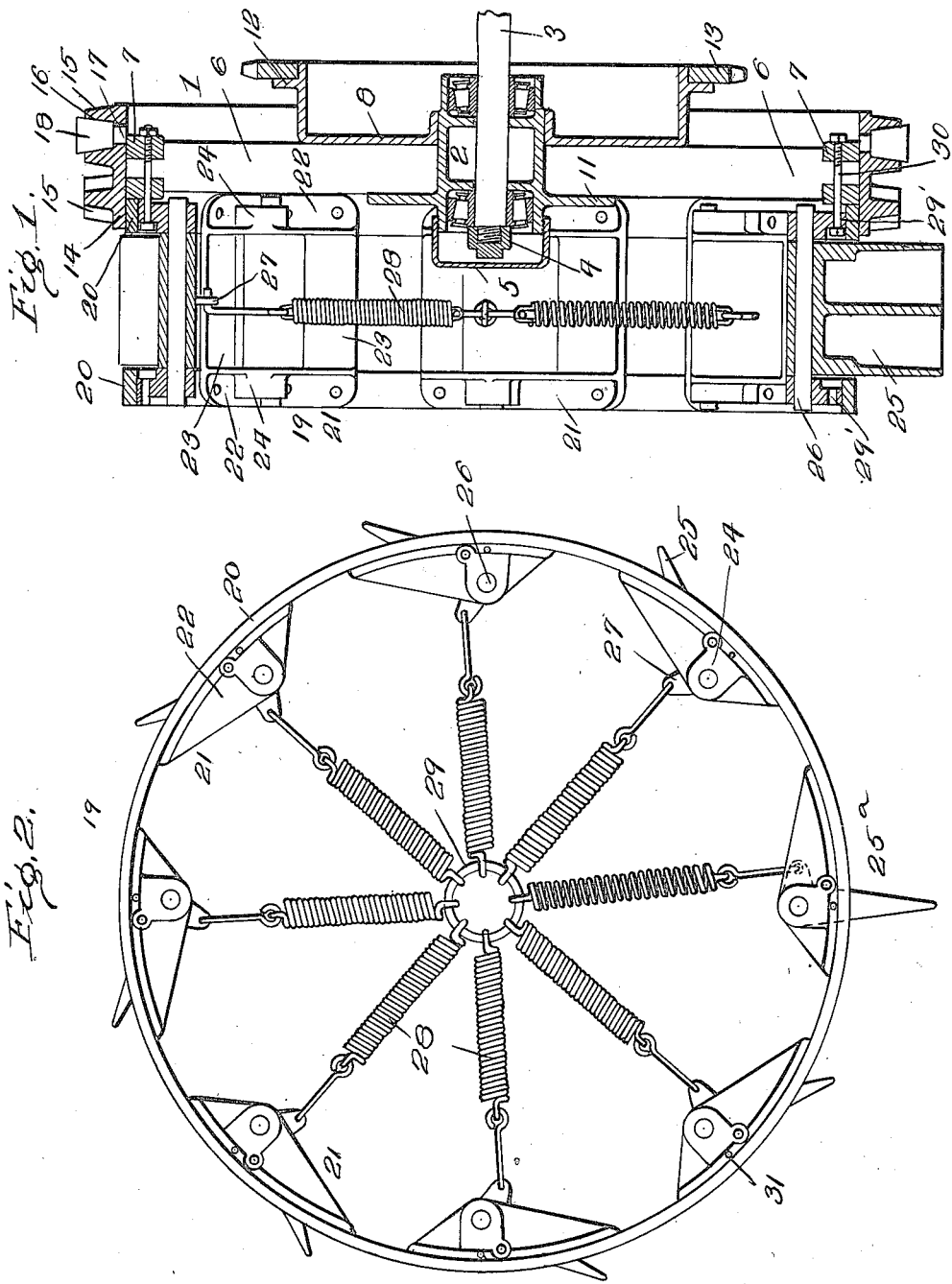

JOHN B. BARTHOLOMEW, OF PEORIA, ILLINOIS, ASSIGNOR TO AVERY COMPANY, A CORPORATION OF ILLINOIS.

TRACTION-WHEEL.

1,229,210.  Specification of Letters Patent.  Patented June 12, 1917.

Application filed September 22, 1909, Serial No. 519,031. Renewed November 4, 1916. Serial No. 129,632.

*To all whom it may concern:*

Be it known that I, JOHN B. BARTHOLOMEW, a citizen of the United States, residing at Peoria, in the county of Peoria and State of Illinois, have invented certain new and useful Improvements in Traction-Wheels, of which the following is a specification, reference being had therein to the accompanying drawing.

This invention relates to an improved wheel and tractive mechanism for traction engines or trucks and is especially adapted to be used on tractors of the automobile or dray type. The principal object of the invention is to provide an improved mechanism which is adapted to increase the tractive efficiency of the wheel while on soft ground without interfering with its normal action while on hard ground. A further object is to provide a tractive mechanism which can be easily attached to or removed from a wheel and which will not contact with the ground during normal operation of the wheel.

One embodiment of my invention is shown in the accompanying drawings. I do not desire, however to limit myself to the exact construction shown, and it will be understood that various changes in detail and in the arrangement of parts may be made within the scope of my invention.

Of the drawings—

Figure 1 is a cross sectional view through a wheel embodying my invention, the auxiliary traction devices for soft ground being shown in place.

Fig. 2 is a side elevation of the auxiliary traction device.

Referring to the drawings, 1 represents as a whole the traction wheel. 2 is the wheel hub which is preferably mounted by means of rollers or other anti-friction bearings on the axle 3. The nut 4 serves to keep the wheel in place and the guard 5 protects the axle and the bearing from dust.

I prefer to construct the spokes and felly of the wheel of wood. 6—6 are the wheel spokes, and these are tapered as shown at their inner ends to engage one another and form a practically continuous ring about the hub proper. The outer ends of the spokes are doweled and inserted in the felly 7, which may be made in sections or, if desired, in a single piece. After the felly, the spokes and the hub have been assembled, the plate 8 is placed, as shown in Fig. 1 and secured in place by means of the bolts 10 which pass through the annular flange 11 of the hub and through holes formed preferably between each pair of adjacent spokes. I find that when the wheel is to be used as a traction wheel instead of merely as a supporting wheel one very satisfactory method of driving it is to extend the plate 8 and provide it with a cylindrical flange 12, upon which is mounted a sprocket ring 13. A drive chain engages this sprocket ring and through it transmits power to the wheel from the engine or motor. The inner surface of the cylindrical flange 12 may be utilized if desired as a brake surface to engage with suitable braking devices within the flange and surrounding the axle and hub.

14 represents the tire of the wheel. This tire I prefer to form of cast steel, and it may be secured in place by shrinking or by any other usual or preferred manner. On the surface of this tire are formed rows of radially extending bosses 15. These bosses may be entirely distinct from one another but I prefer to construct them as overlapping and joining. Each of the bosses is provided with a tapering opening 16 in its center, which extends preferably to approximately the plane of the outer surface of the tire at the base of the bosses. At the bottom of each of these apertures I prefer to form a second opening 17 somewhat smaller in size and extending entirely through the tire. The bosses are preferably circular and are provided with circular apertures for the sake of cheapness and simplicity of construction. In each of the apertures 16 is driven a plug 18 which is held in place by friction. This plug is formed preferably of wood, such as hard maple, but other suitable materials, such as rubber may be used. These plugs are designed to extend out beyond the ends of the bosses 15 a suitable distance, as for instance one-half inch.

The tire may have one row of bosses, as above described. I prefer, however, to construct it with two parallel rows, and in certain cases three, or even more, rows may be found desirable. When two or more rows are used, the bosses of each row should be staggered relative to those of the next adjacent row.

The plugs 18 may be readily replaced from time to time after they have become worn or broken. It will be noted that with two rows of bosses and plugs, as shown in Fig. 1, the apertures 17 extend outside of the felly, so that a suitable drift may be inserted in the apertures and the plugs driven out.

19 represents as a whole an auxiliary traction device which may be bolted to the wheel when the traction machine is to be used on soft or slippery ground. The frame of this auxiliary traction device comprises two metal rings 20, 20. These rings are connected, preferably by riveting, to the frames or brackets 21, and are thus held in definite parallel relation to one another. The brackets 21 are rectangular in shape and comprise the two side pieces 22, which engage the rings 20 and the two cross pieces 23 which extend perpendicularly between the two rings. Each of the brackets is provided with two bearing lugs 24. Between these two lugs are mounted vanes or wings 25. These vanes are pivotally mounted on pins 26 which pass through the bearing lugs and are secured in place by cotter pins or other suitable devices. Each of the vanes has a perpendicularly extending arm 27 to which is attached a tension coiled spring 28. Each of these springs 28 extends radially inward and is attached to a ring 29 located at the center of the traction devices. The tendency of the springs is to swing the vanes inward to their extreme position as limited by the part 23.

Holes 29' are provided in each of the brackets 21 through which pass the bolts 30 which also pass through the felly, and by means of which the auxiliary traction device is secured to the wheel proper. It will be noted that holes 29 are provided in each side of the brackets, which makes it possible for the traction devices to be secured to a wheel on either side of the traction machine.

The auxiliary tractor remains inoperative so long as the wheels are on hard ground. On soft ground, however, where the wheels sink in and a certain amount of slippage occurs the vanes at the bottom of the wheel swing outward until they assume a radial position, as indicated by 25ᵃ on Fig. 2. This gives the wheel a firm grip on the soil and absolutely prevents all further slippage. As soon as the vanes have passed upward beyond the bottom of the wheel, the springs immediately return them to their normal position. In some cases, however, it may be found desirable to maintain the vanes in their extended position throughout the revolution. This may be done by inserting pins in the apertures 31 of the brackets. These pins will engage the vanes and hold them in their radial position.

It will be noted that the wheels themselves, even without the auxiliary traction devices attached, are fairly efficient tractors on soft ground. The bosses and plugs will enter the ground and in many cases prevent slippage.

I do not, however, specifically claim the wheels themselves without the auxiliary traction devices as they are made the subject of another application, Serial No. 532,086, for vehicle wheels, filed by me on December 8, 1909, as a division of this application.

What I claim is—

1. The combination with a traction wheel having a ground engaging bearing surface, of a detachable auxiliary traction mechanism comprising a rim, the outer bearing surface of which is of smaller diameter than the bearing surface of the wheel, ground engaging devices movably mounted upon the auxiliary mechanism, and means for normally holding the said devices in retracted positions out of engagement with the ground, the said devices being automatically movable into their extended ground gripping positions upon engagement with the ground and slippage with respect thereto, substantially as set forth.

2. An auxiliary traction device for traction wheels comprising a frame, vanes pivotally connected to said frame and adapted to extend in a radial direction, and continuously operative devices tending to maintain all of said vanes in non-radial positions, substantially as set forth.

3. In an auxiliary traction device for traction wheels, the combination of an annular frame, ground engaging wings movably connected to said frame, means for holding the wings in normal inoperative positions, and the said holding means being capable of permitting the wings to move into their ground engaging positions upon the slippage of the wheel, substantially as set forth.

4. In a traction device, the combination of an annular frame, wings pivotally connected to said frame and adapted to assume radial positions, means for limiting the movement of the wings in one direction beyond the radial position, and continuously operative means tending to hold the wings normally in positions at angles to the radii through the pivotal axes, substantially as set forth.

5. In a traction device, the combination of an annular frame, ground engaging wings pivotally connected to said frame and adapted to assume radial positions, continuously operative devices tending to maintain the wings in non-radial positions, and means for locking the said wings in their radial positions, substantially as set forth.

6. In a traction device, the combination of a frame, ground engaging vanes movably connected to said frame, and tension coiled springs, one for each vane, tending to hold the vanes in normal inoperative positions, each of the springs extending radially inward and being attached to one another at their inner ends, substantially as set forth.

7. In a traction device, the combination of an annular frame, ground engaging vanes pivotally attached to said frame and adapted to assume radial positions, yielding means for holding the vanes normally in positions at angles to the radii through their pivotal axes and extending in the direction of rotation of the traction device, whereby circumferential slippage of the traction device relative to the ground will cause the vanes at the lower part of the periphery to assume radial positions and thereby firmly engage the ground, substantially as set forth.

8. The combination of a traction wheel and an auxiliary traction device adapted to be secured to the wheel, the said auxiliary device comprising two parallel annular rings, a plurality of brackets connecting said rings, vanes located between the rings and pivotally mounted upon the brackets, the vanes being capable of assuming substantially radial positions, and means for normally holding the vanes in positions at angles to the radial positions, substantially as set forth.

9. In a traction wheel, the combination with a wheel hub and spokes, of a rim provided with a main bearing surface and with a secondary bearing surface of smaller diameter than the main bearing surface, movably mounted ground engaging devices attached to said wheel, and means for normally holding the said devices in their retracted positions out of engagement with the ground, the said devices being automatically moved into their extended ground gripping positions upon engagement with the ground and slippage with respect thereto, substantially as set forth.

10. In a traction wheel, the combination with a wheel hub and spokes, of a rim provided with a bearing surface, ground engaging devices attached to said wheel and movable into and out of ground engaging positions, and means for normally holding the said devices in retracted positions out of engagement with the ground, the said devices being automatically movable into their extended ground gripping positions upon engagement with the ground and slippage with respect thereto, substantially as set forth.

11. In a traction device, the combination of a frame, ground engaging vanes movably connected to said frame, tension coiled springs, each connected at its outer end to one vane to tend to hold the vane in normal inoperative position, and a ring near the center of the frame to which the inner ends of all of the said springs are connected, substantially as set forth.

12. In a traction device, the combination of a frame, ground engaging vanes movably connected to the frame, tension coiled springs, each connected at its outer end to one vane to tend to hold the vane in normal inoperative position, and a floating connection for the inner ends of the said coiled springs, the said connection being freely movable under the influence of the springs, substantially as set forth.

13. In a traction device, the combination of two parallel annular rings, a plurality of brackets connecting the rings, vanes located between the rings and pivotally mounted upon the brackets, the vanes being capable of assuming substantially radial positions, and means for normally holding the vanes in non-radial positions, substantially as set forth.

In testimony whereof I affix my signature, in presence of two witnesses.

JOHN B. BARTHOLOMEW.

Witnesses:
A. L. GREGORY,
LEE W. HAZARD.